(12) United States Patent
Poran (10) Patent No.: US 11,174,075 B2
(45) Date of Patent: Nov. 16, 2021

(54) CONTAINERS WITH TAMPER INDICATIVE HATCH FOR SAMPLE REMOVAL

(71) Applicant: PLASGAD PLASTIC PRODUCTS ACS LTD, Kibbutz Gadot (IL)

(72) Inventor: Iftah Poran, El-Rom (IL)

(73) Assignee: PLASGAD PLASTIC PRODUCTS ACS LTD, Kibbutz Gadot (IL)

( * ) Notice: Subject to any disclaimer, the term of this patent is extended or adjusted under 35 U.S.C. 154(b) by 0 days.

(21) Appl. No.: 16/463,381

(22) PCT Filed: Dec. 5, 2017

(86) PCT No.: PCT/IB2017/057639
§ 371 (c)(1),
(2) Date: May 23, 2019

(87) PCT Pub. No.: WO2018/104852
PCT Pub. Date: Jun. 14, 2018

(65) Prior Publication Data
US 2019/0337677 A1 Nov. 7, 2019

(30) Foreign Application Priority Data
Dec. 5, 2016 (GB) ..................... 1620681

(51) Int. Cl.
*B65D 25/54* (2006.01)
*B29D 22/00* (2006.01)
*B65D 21/02* (2006.01)
*B65D 85/34* (2006.01)

(52) U.S. Cl.
CPC .......... *B65D 25/54* (2013.01); *B29D 22/003* (2013.01); *B65D 21/0215* (2013.01); *B65D 85/34* (2013.01); *B65D 2201/00* (2013.01); *B65D 2401/10* (2020.05)

(58) Field of Classification Search
CPC .. B65D 17/402; B65D 17/4012; B65D 17/28; B65D 50/00; B65D 25/54; B65D 2401/10; B65D 21/0215; B65D 85/345; B65D 85/34; B65D 2201/00; B29D 22/03
USPC ........................................................ 220/712
See application file for complete search history.

(56) References Cited

U.S. PATENT DOCUMENTS

| 3,326,406 A | * | 6/1967 | Brown ............... | B65D 17/4012 |
| | | | | 220/269 |
| 3,390,805 A | * | 7/1968 | Khoury ............... | B65D 17/402 |
| | | | | 220/270 |
| 3,499,572 A | | 3/1970 | Ruekberg | |
| 4,056,210 A | * | 11/1977 | Boyle ................. | B65D 47/10 |
| | | | | 220/712 |
| 4,332,332 A | | 6/1982 | Ingemann | |
| 4,724,977 A | | 2/1988 | Cleevely et al. | |

(Continued)

FOREIGN PATENT DOCUMENTS

WO   2016/051367   4/2016

*Primary Examiner* — Stephen J Castellano
(74) *Attorney, Agent, or Firm* — Mark David Torche; Patwrite Law (57) ABSTRACT

Disposable containers with a tamper indicative hatch for sample removal, methods of manufacturing and using the same are described; the containers are configured with a closure essentially obstructing the hatch, so that upon opening the hatch, the container bears a visually apparent indication that the closure has been subjected to tampering and opening.

10 Claims, 11 Drawing Sheets

(56) References Cited

U.S. PATENT DOCUMENTS

| | | | |
|---|---|---|---|
| 4,917,255 A | 4/1990 | Foy et al. | |
| 4,986,465 A | 1/1991 | Jacobsson et al. | |
| 8,584,875 B2 | 11/2013 | Clodfelter et al. | |
| 2005/0092749 A1* | 5/2005 | Durdon | B65D 47/0847 220/254.3 |
| 2010/0308104 A1 | 12/2010 | Kohler et al. | |
| 2011/0049227 A1* | 3/2011 | Gretzinger | B65D 5/541 229/117.12 |
| 2011/0240657 A1 | 10/2011 | Orgeldinger | |
| 2016/0096667 A1 | 4/2016 | Huffer | |

\* cited by examiner

CONTAINERS WITH TAMPER INDICATIVE HATCH FOR SAMPLE REMOVAL

This application is the national stage (Rule 371) of international application No. PCT/IB2017/057639 filed 5 Dec. 2017.

TECHNICAL FIELD

In general, the present invention pertains to the art of transportation. In particular, the invention relates to disposable containers including a tamper indicative hatch configured for sample removal.

BACKGROUND ART

It is believed that the current state of the art is represented by the following patent literature: U.S. Pat. Nos. 2,054,785, 537,026, 5,542,598, 7,340,995, US20110240657, US2013146602, US2015197374, US2016039598, US2016096667, EP2698322, GB2489326, GB1324670 and WO2014176292.

It is often desirable to randomly sample a fruit while it is in boxes or crates that are frequently stacked several layers high in ripening rooms or cargo shipment containers. Corrugated boxes and disposable plastic containers are typically cut open for sampling, using a knife. Such a procedure commonly used in the art is potentially damaging for the fruit and may lead to unnecessary contributing to further box failure and fruit damage. Conventional plastic containers, known in the art, however, do not have an optimal completely non-destructive means for fruit sampling when crates are stacked. Moreover, disposable plastic containers in the art are not known to contain a means for fruit sampling when crates are stacked. Furthermore, prior art teaches nether an effective means of forming a rotation hinge for the door of the hatch for sample removal nor a means of securing the door of the sample removal hatch in an open conformation.

US2016039598 and WO2014176292 teach a collapsible, reusable plastic container that can be used for the storage and transportation of produce. The container according to US2016039598 may also have a sample door with a clip for easy access to the produce contained in the container when it is stacked among other containers. The sample door of US2016039598 provides fruit graders with access to fruit in every crate on a pallet without de-stacking. The access door in US2016039598 can be opened and closed repeatedly throughout the life of the crate without affecting the structural integrity of the crate, the protection of the fruit (e.g., bananas) or produce in the crate, or the life of the crate.

US20110240657 teaches a reusable crate having a bottom and two respective pairwise opposing side walls and end walls, where the end wall has a thinned portion, so that the thinned portion is adapted to allow the user to cut the end wall for providing an inspection opening.

SUMMARY OF THE INVENTION

There are provided in accordance with some embodiments of the present invention, typically disposable, containers with a tamper indicative hatch configured for sample removal.

It is an objective of the present invention to provide a container with a tamper indicative hatch configured for sample removal.

It is another objective of the present invention to facilitate convenient sample removal from selected containers, while containers are stacked-up in several layers on the pallet, for instance in ripening rooms or cargo shipment containers.

It is another objective of the present invention to provide a tamper indicative hatch for sample removal, so that upon removal of a sample from the container, the container will bear an indication that the sample removal hatch has been opened.

In order to address the aforementioned objectives, the container of the invention is provided with a hatch door surrounded by perforation or other structural feature, such as peripheral groove, weakening the material of the container around the hatch door. The hatch door may be further permanently connected to the container by a bendable hinge portion as well as by cleavable tamper indicative interconnectors.

The hatch door in the plastic containers of the invention is surrounded by a perforation pattern or other structural feature, such as a peripheral groove, weakening the material of the container around the hatch door and connected to the container by cleavable tamper indicative interconnectors, thereby facilitating convenient sample removal mechanism from the containers, as well as providing readily apparent tamper indication that the container's door has been opened.

The hatch door in the plastic containers of the invention facilitates convenient opening of the sample removal door, merely by manual force and without any auxiliary means, such as scissors or knife, only by tearing or detaching the perforation or peripheral groove surrounding the hatch door, by bare hands.

The hatch door in the plastic containers of the invention provides an optimal and completely non-destructive means for fruit sampling when containers are stacked, effectively preventing a potential damage to the contents of the container when using auxiliary means, such as scissors or knife, to open hatch.

Moreover, the hatch door of the invention preferably provides a mechanism of securing the closure of the sample removal hatch in an open conformation.

DESCRIPTION OF THE DRAWINGS

The present invention will be understood and appreciated more comprehensively from the following detailed description taken in conjunction with the appended drawings in which.

While the invention is susceptible to various modifications and alternative forms, specific embodiments thereof have been shown merely by way of example in the drawings. The drawings are not necessarily complete and components are not essentially to scale; emphasis instead being placed upon clearly illustrating the principles underlying the present invention.

DETAILED DISCLOSURE OF EMBODIMENTS

Figure 1A:
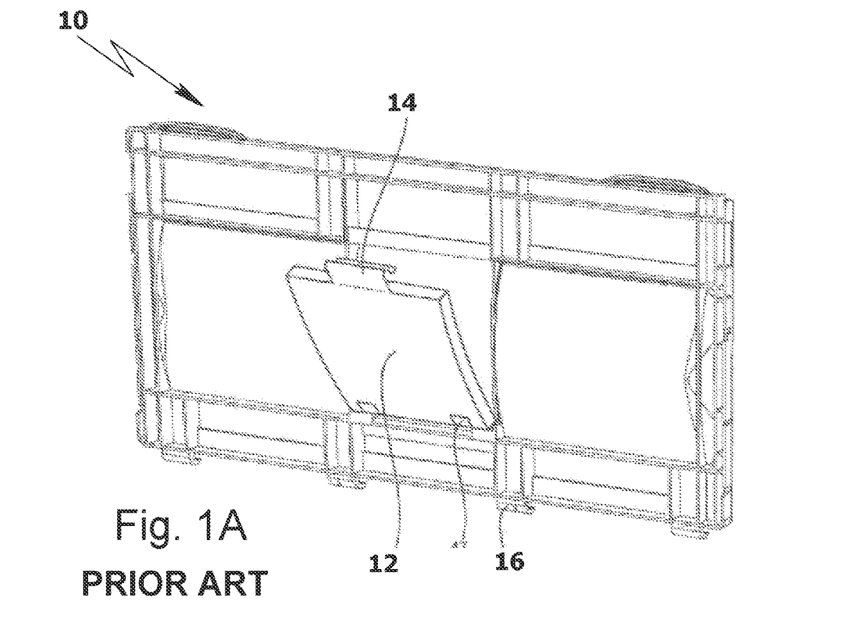
FIG. 1A is perspective view of a sample removal door of a reusable prior art container, without tamper indication capabilities, disclosed in US2016039598 and WO2014176292.

Prior to elaborating any embodiment of the present invention, in order to present the background of the inventive concept more clearly, reference is firstly made to FIG. 1A, showing a hatch for sample removal known in the art, in wall 10 of the container disclosed in a more detail in US2016039598 and WO2014176292, notably without tamper indication capabilities. Wall 10 with hinge 16 has an opening in which a door 12 is mounted in such a way that does not cut through the perimeter of wall 10. Such door 12 constructed from the same material as wall 10 is hingeably mounted or attached to the opening to allow the door 12 to pivot and be opened and closed. Opening the door 12 permits visual inspection and/or sampling of the product in the container, even when the container is within a stack of other containers on a pallet. The door 12 can be closed again, renewing the protective barrier that wall 10 to the contents of the container in storage or transport. Optionally, when door 12 is in the closed position, door 12 is coupled or attached to wall 10 by a clip 14 that prevents the door 12 from opening without user action.

The opening and door 12 in wall 10 and clip 14 having the form of a spring tang. The curved fruit sampling door 12 incorporates clip 14 that, when engaged, holds the door 12 closed and when disengaged allows door 12 to open to provide access to the contents of the container. Optionally, the clip 14 is a "low profile spring tang" mechanism which fits within the thickness of wall 10, not extending inside the curved surface of wall 10 or outside the plane as defined by the outside surface of wall 10. The mechanism of the clip 14 is reusable, allowing for repeated opening and closing of the sample door 12. The clip 14 is rotated outward to disengage clip 14 and allow door 12 to open. Door 12 and clip 14 are rotated inward with slight pressure to engage clip 14 and the latch bracket (not shown). Because of the door's 12 material, its hinged connection 18 and the use of dip 14 to secure it, the door 12 can be opened and closed repeatedly throughout the life of the container without affecting the structural integrity of the container, the protection of the product in the container or the life of the container.

Figure 1B:
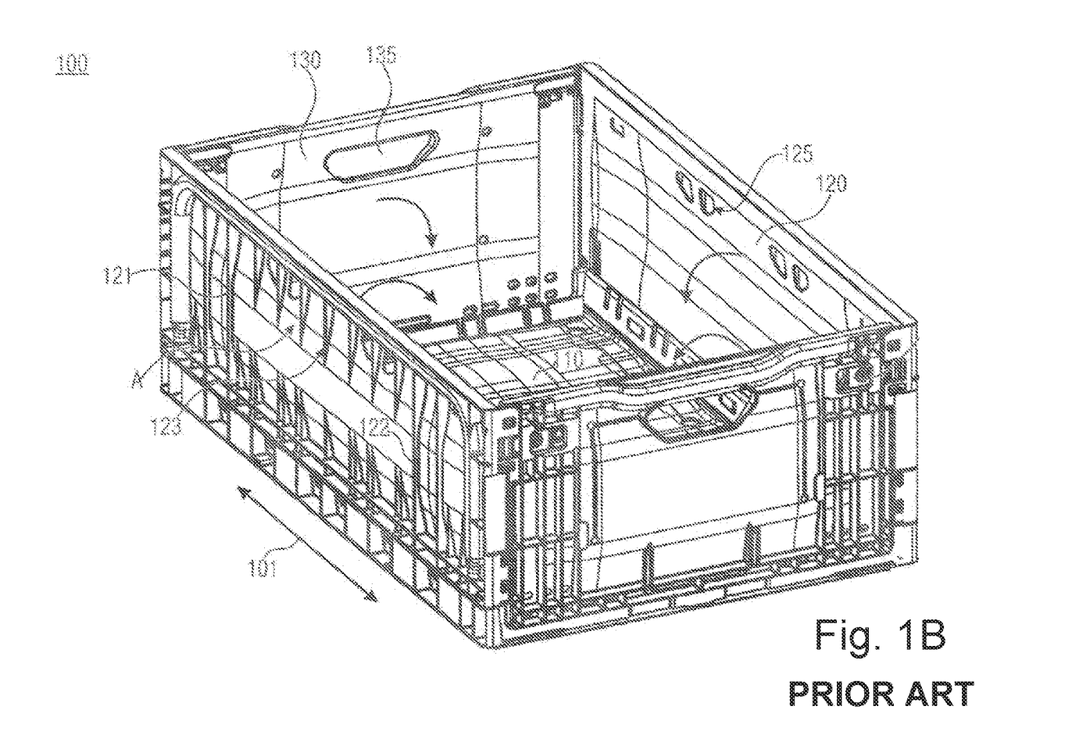
FIG. 1B is a perspective view of sample removal door of another reusable prior art crate, disclosed in US20110240657, requiring auxiliary opening or cutting tools to render the sample removal door open.
Figure 1C:
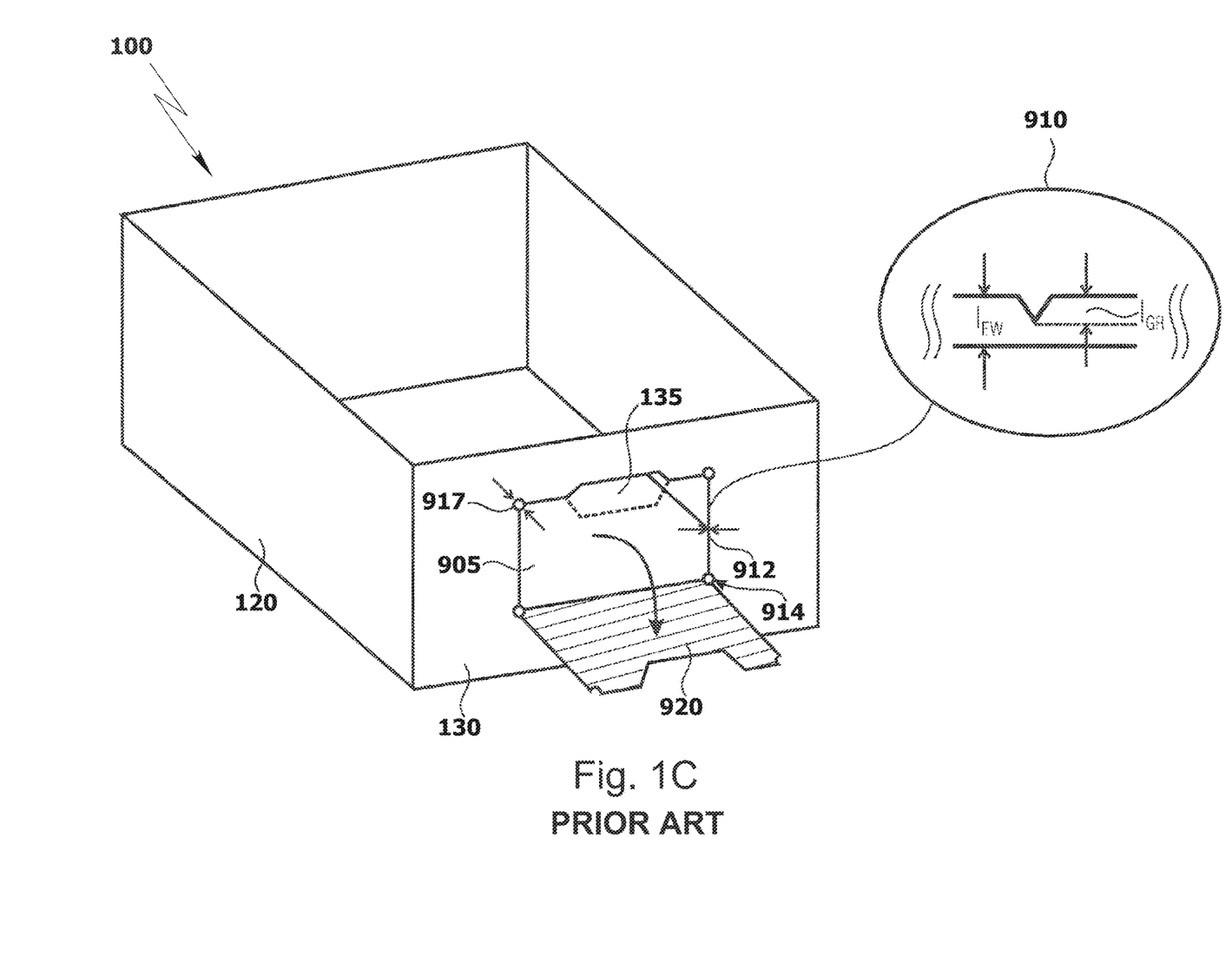
FIG. 1C is a perspective and enlarged views of an openable portion of the reusable prior art crate, disclosed in US20110240657, requiring auxiliary opening or cutting tools to render the sample removal door open.

To elaborate the background of the inventive concept of the present invention further, by depicting another hatch for sample removal known in the art, reference is now made to FIG. 1B, showing crate 100 disclosed in a more detail in US20110240657, notably requiring auxiliary opening or cutting tools to render the sample removal door open. As shown in FIG. 1B, each side wall 120 comprises a plurality 125 of vent holes, while each end wall 130 comprises a grip hole 135. Referring now to FIG. 1C, showing crate 100 with an openable portion. The end wall 130 comprises a thinned portion 910, where the thinned portion 910 may be configured as a groove. This groove 910 is made in the end wall 130 and surrounds at least three sides of a predefined area 905. As can be seen in FIG. 1C embodiment, the predefined area 905 is substantially rectangular. The zoom view shows that the groove 910 comprises a thickness I-(GR) in a direction perpendicular to the end wall 130, which is more than half of the thickness I(EW) of the end wall 130. This characteristic of the groove 910 allows for an easy cutting thereof. Furthermore, along the groove 910, a plurality 915 of holes may be arranged, wherein each hole may have a diameter 917 larger than a width 912 of the groove 910. The width 912 may typically be equal or larger than 6 mm. The dimensioning of the holes 915 is therefore such that a knife, which is commonly used by a controller, can be easily introduced into them and then cut along the groove 910. By cutting the groove 910, an openable portion 920 may be provided, which is essentially attached to the end wall 130. The openable portion 920 can be unfolded as indicated by the arrow. The purpose of providing such an openable portion is that the user can take a look inside the interior of the crate 100 for inspecting the accommodated products. For example, it can be checked whether carried fruits such as bananas have already reached a certain degree of ripeness. The end wall 130 may be made of plastic, such that a normal knife can be used by the controller. FIG. 1C shows also that the predefined area 905 may be more than one third of an area of the end wall 130 so as to provide a large enough inspection opening.

Illustrative embodiments of the invention are described below. In the interest of clarity, not all features of actual implementation are described in this specification. It will of course be appreciated that in the development of any such actual embodiment, numerous implementation-specific decisions must be made to achieve the developers' specific goals, such as compliance with technology- or business-related constraints, which may vary from one implementation to another. Moreover, it will be appreciated that the effort of such a development might be complex and time-consuming, but would nevertheless be a routine undertaking for those of ordinary skill in the art having the benefit of this disclosure.

Figure 2A:
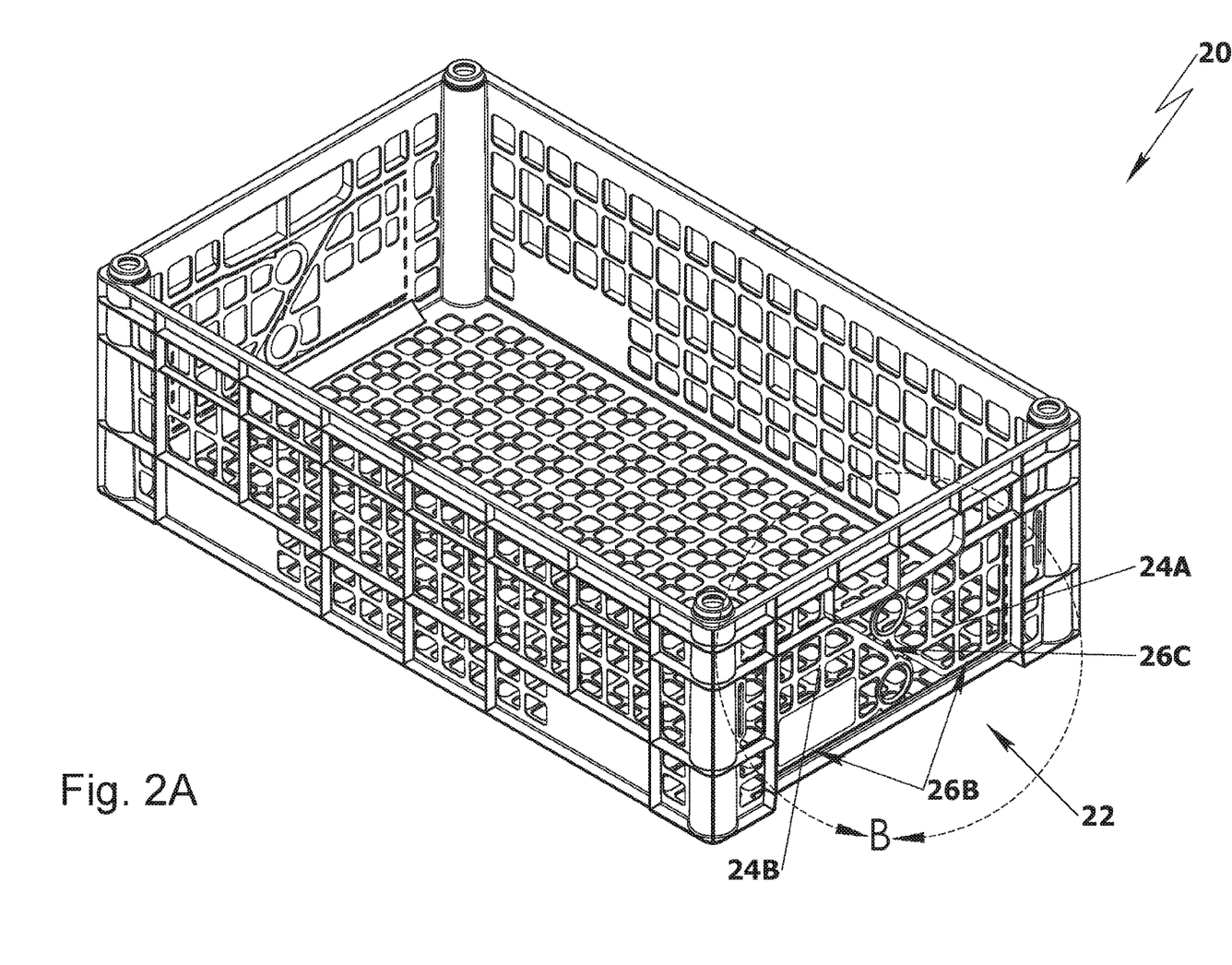
FIG. 2A is a schematic isometric view of an embodiment of a disposable container, according to the present invention, configured with a tamper indicative hatch for sample removal.
Figure 2B:
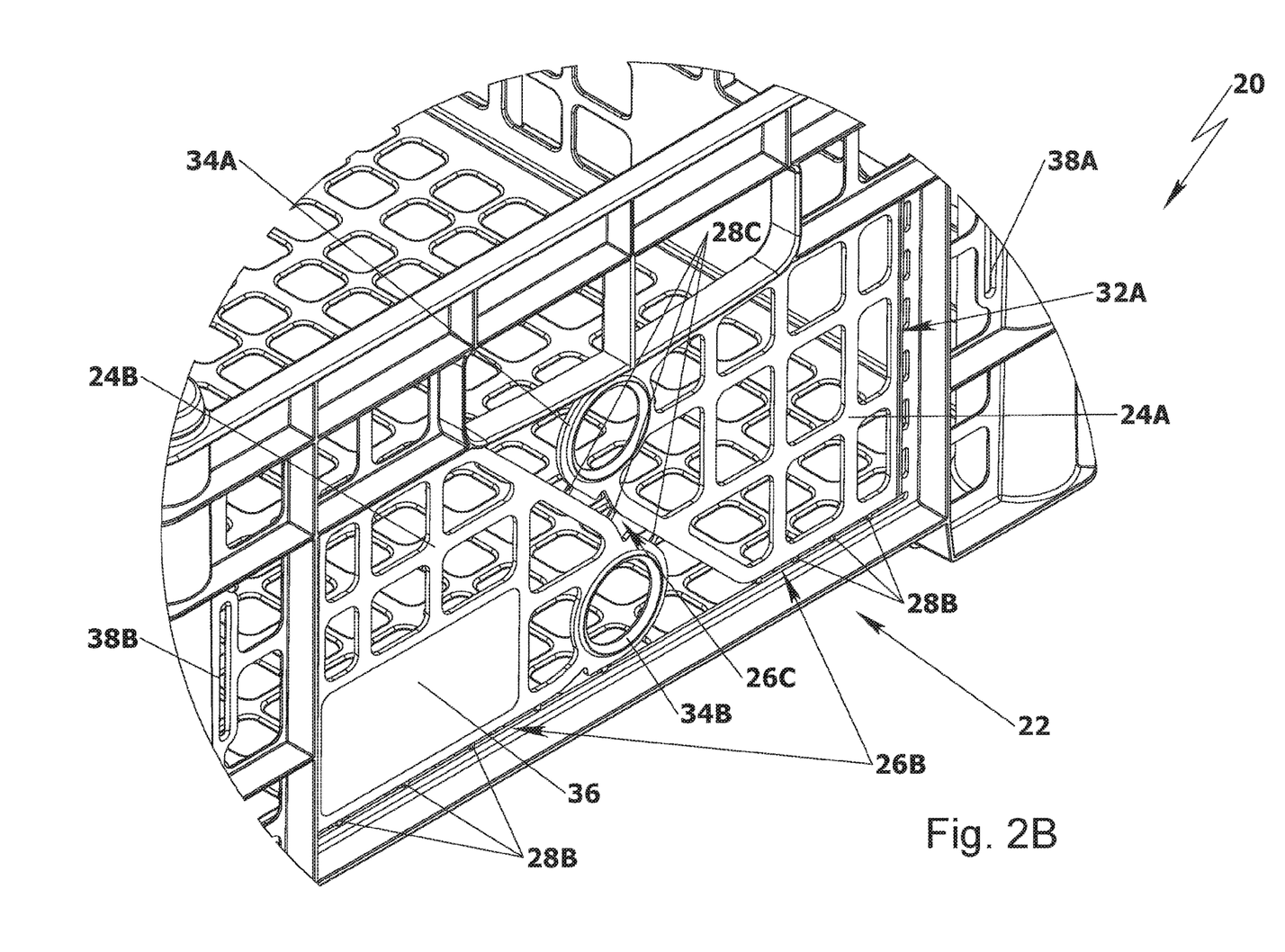
FIG. 2B is an enlarged isometric view of an embodiment of a door of the tamper indicative hatch for sample removal, according to the present invention.
Figure 2C:
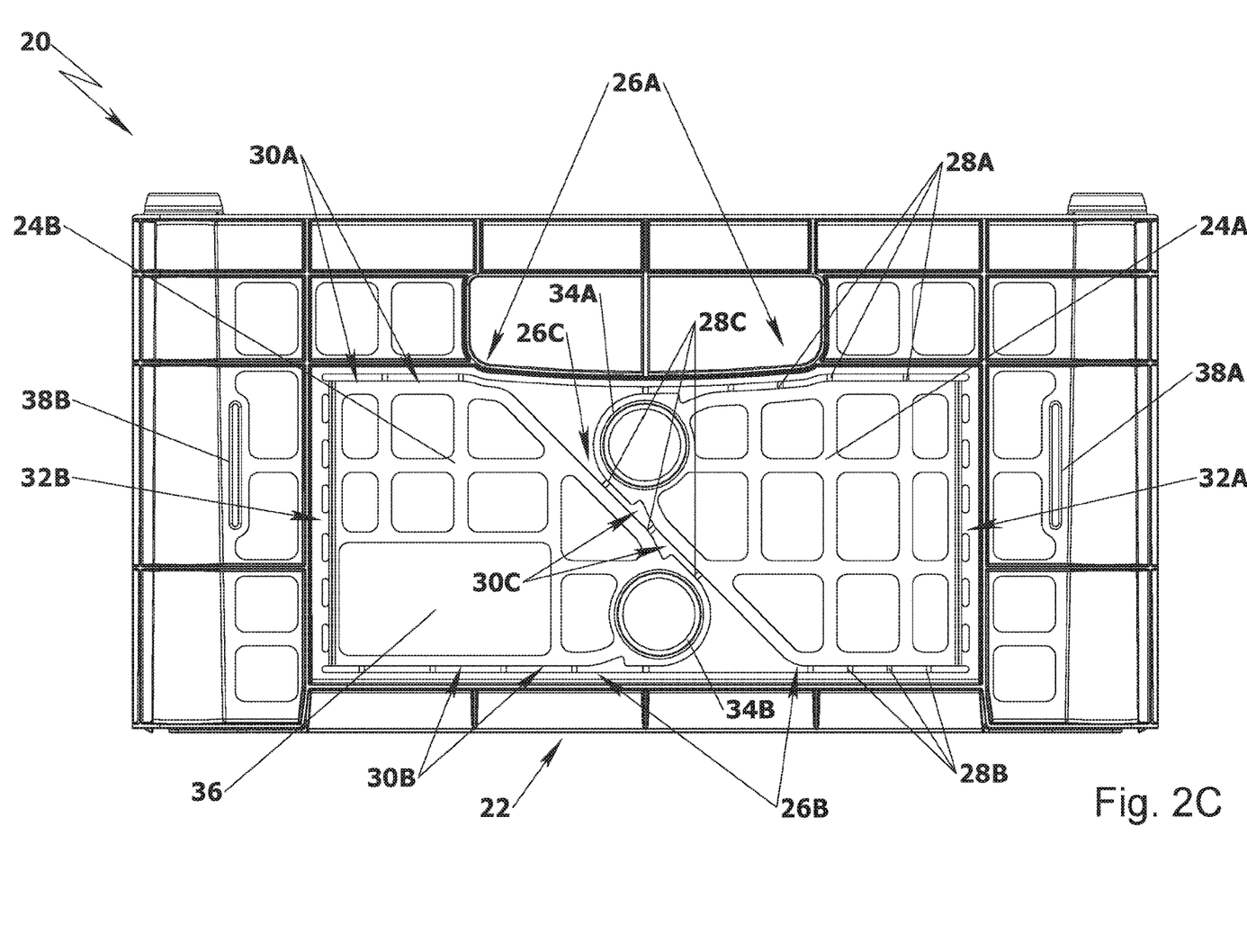
FIG. 2C is a schematic front view of an embodiment of the disposable container, according to the present invention, configured with a tamper indicative hatch for sample removal.

In accordance with some preferred embodiments of the present invention, reference is now made to FIG. 2A to 2C, showing disposable container 20. Disposable container 20 is preferably stackable and comprises a bottom plate and two pairs of sidewalls. Disposable container 20 comprises hatch 22, facilitating removal of a sample from disposable container 20. Sample removal hatch 22 is obstructed by hatch closures 24A and 24B. Hatch closures 24A and 24B comprise a mechanism providing for indication of whether hatch closures 24A and 24B have been tampered and/or opened. Exemplary mechanism providing for indication of whether hatch closures 24A and 24B have been tampered and/or opened embodies perforation pattern 26A disposed in-between the top edges of closures 24A and 24B and the top edge of hatch 22, perforation pattern 26B disposed in-between the bottom edges of closures 24A and 24B and the bottom edge of hatch 22 as well as perforation pattern 26C disposed in-between the diagonal edge of closure 24A and the diagonal edge of closure 24B.

Perforation patterns 26A, 26B and 26C comprise essentially elongated gaps 28A, 28B and 28C interposed by detachable connectors 30A, 30B and 30C. Elongated gaps 28A, 28B and 28C as well detachable connectors 30A, 30B and 30C are preferably not equidistant. Detachable connectors 30A interconnect the top edges of closures 24A and 24B with the top edge of hatch 22, while detachable connectors 30B interconnect the bottom edges of closures 24A and 24B with the bottom edge of hatch 22, whereas detachable connectors 30C interconnect the distal diagonal edge of closure 24A with the distal diagonal edge of closure 24B.

Disposable container 20 further comprises hinge perforation patterns 32A and 32B, disposed in-between lateral proximal edges of hatch 22 and proximal edges of hatch closures 24A and 24B. Hinge perforation patterns 32A and 32B are configured to sustain partial rotation of hatch closures 24A and 24B, typically outwards disposable container 20, by being slightly bent or deformed, without disconnecting hatch closures 24A and 24B lateral edges of hatch 22 and while substantially maintaining structural integrity of hinge perforation patterns 32A and 32B.

Hatch closures 24A and 24B further comprise annular finger tabs 34A and 34B, facilitating initially disconnecting detachable connectors 30A, 30B and 30C of perforation patterns 26A, 26B and 26C, by pulling onto finger tabs 34A and 34B, as well as then driving hatch closures 24A and 24B into an open conformation (not shown), by slightly bending or deforming hinge perforation patterns 32A and 32B.

At least one of hatch closures 24A or 24B preferably further comprises a planar surface, such as planar surface 36 on hatch closures 24A, configured for inscribing miscellaneous information thereon, such as lot number, shipment date, etc.

Disposable container 20 preferably further comprises lateral grooves 38A and 38B. Lateral grooves 38A and 38B are configured to receive finger tabs 34A and 34B, in an open conformation (not shown), and lock the latter within the former. Upon opening hatch closures 24A and 24B, by pulling onto finger tabs 34A and 34B and bending or deforming hinge perforation patterns 32A and 32B as well as by bending or deforming hatch closures 24A and 24B, finger tabs 34A and 34B are cable of being drawn towards lateral grooves 38A and 38B, respectively.

Upon introducing finger tabs 34A and 34B into lateral grooves 38A and 38B and releasing hatch closures 24A and 24B, hatch closures 24A and 24B are spontaneously locked within lateral grooves 38A and 38B, due to the elastic bias of perforation patterns 32A and 32B as well as the elastic bias of hatch closures 24A and 24B, thereby rendering hatch 22 in an open conformation (not shown) and facilitating sample removal from disposable container 20. Upon completion of sample removal from disposable container 20, finger tabs 34A and 34B are typically released from lateral grooves 38A and 38B by forcefully pulling finger tabs 34A and 34B away from disposable container 20 and hatch closures 24A and 24B are spontaneously driven by the elastic bias of perforation patterns 32A and 32B as well as the elastic bias of hatch closures 24A and 24B, into a re-closed conformation (not shown), essentially resembling to the closed conformation shown in FIG. 2A to 2C.

It is emphasized, however, that contradistinctively to the container disclosed in US2016039598 shown in FIG. 1, upon completion of sample removal from disposable container 20 and return of hatch closures 24A and 24B into a re-closed conformation (not shown), essentially resembling to the closed conformation shown in FIG. 2A to 2C, the mechanism of perforation patterns 26A, 26B and 26C still bears a clear indication vividly apparent upon visual inspection that hatch closures 24A and 24B have been tampered and/or opened since detachable connectors 30A, 30B and 30C remain disconnected and closures 24A and 24B typically remain slightly bent or disposed somewhat outwards hatch 22.

Figure 3A:
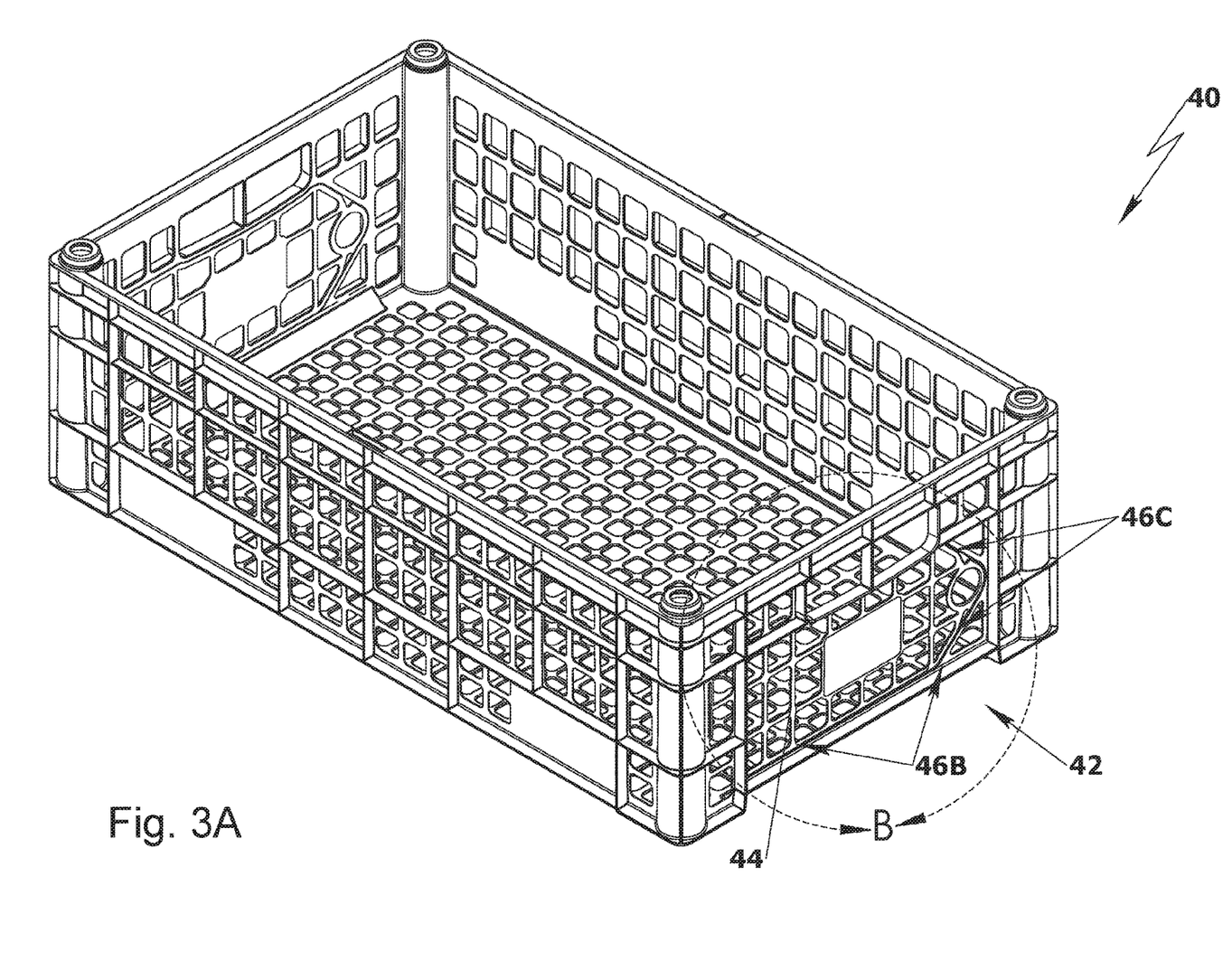
FIG. 3A is a schematic isometric view of another embodiment of a disposable container, according to the present invention, configured with a tamper indicative hatch for sample removal.
Figure 3B:
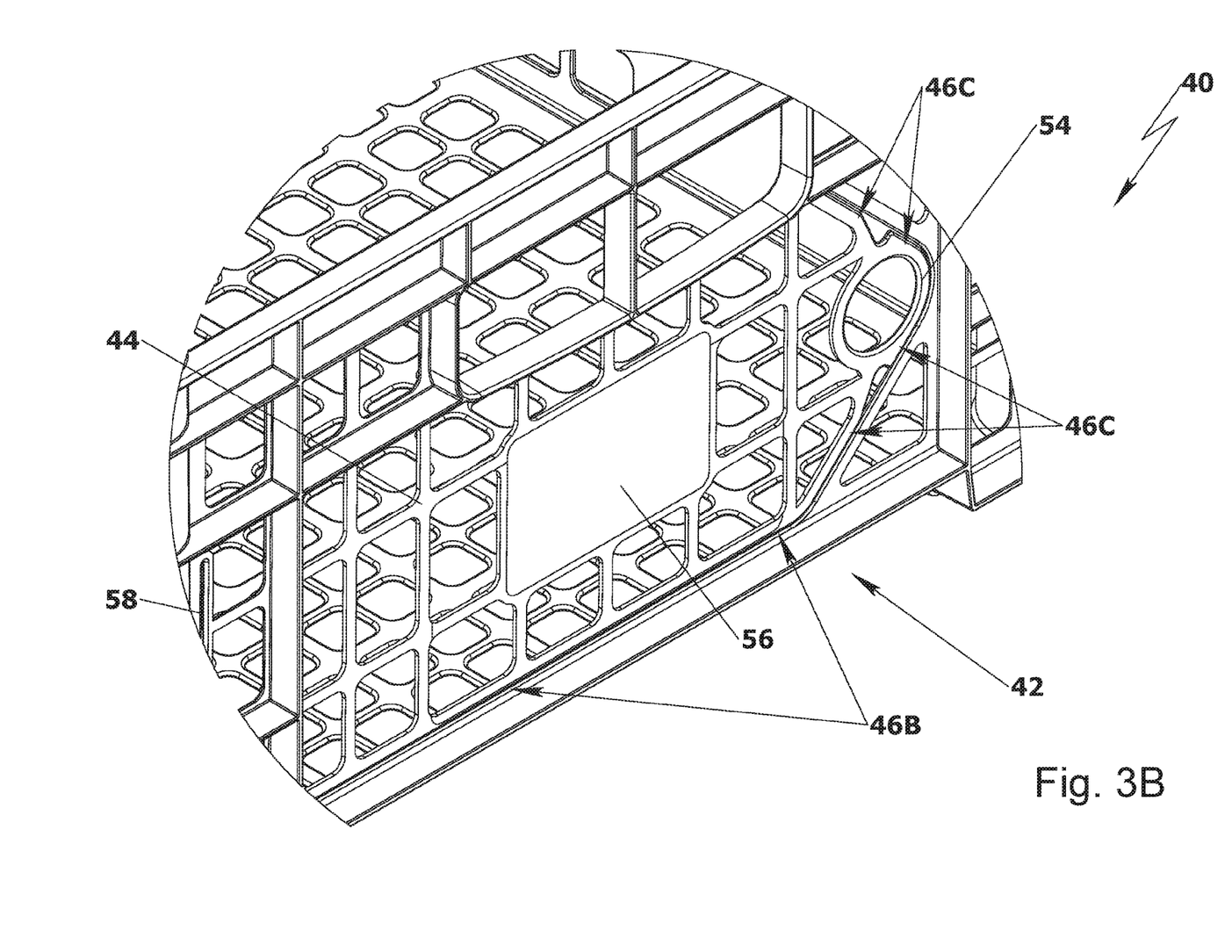
FIG. 3B is an enlarged isometric view of another embodiment of a door of the tamper indicative hatch for sample removal, according to the present invention.
Figure 3C:
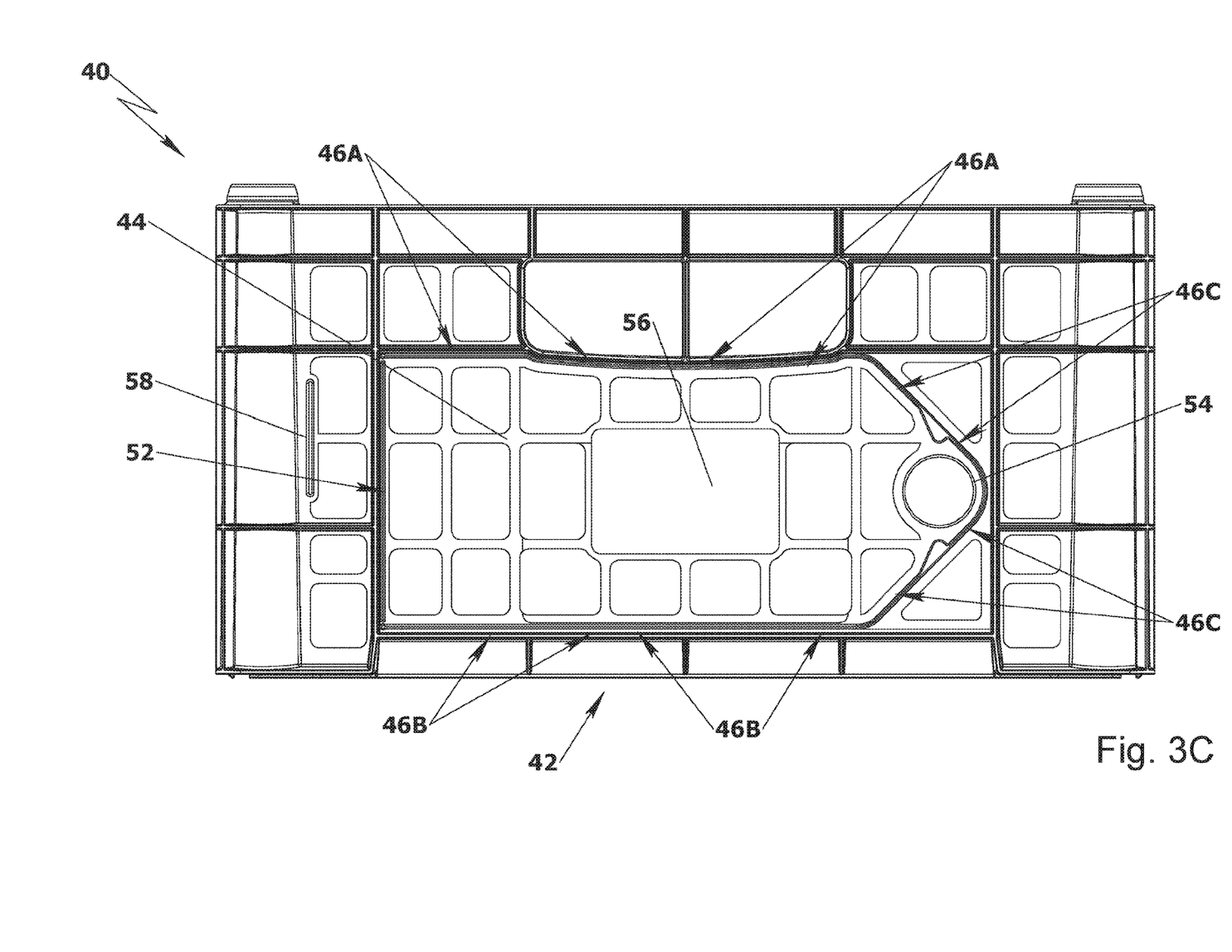
FIG. 3C is a schematic front view of another embodiment of the disposable container, according to the present invention, configured with a tamper indicative hatch for sample removal.

In accordance with some other preferred embodiments of the present invention, reference is now made to FIG. 3A to 3C, showing disposable container 40. Disposable container 40 comprises hatch 42, facilitating removal of a sample from disposable container 40. Sample removal hatch 42 is obstructed by hatch closure 44. Hatch closure 44 comprises a mechanism providing for indication of whether hatch closure 44 has been tampered and/or opened. Exemplary mechanism providing for indication of whether hatch closure 44 has been tampered and/or opened embodies peripheral groove 46A disposed in-between the top edge of closure 44 and the top edge of hatch 42, peripheral groove 46B disposed in-between the bottom edge of closure 44 and the bottom edge of hatch 42 as well as peripheral groove 46C disposed in-between the distal diagonal edges of closure 44 and the diagonal edges of hatch 42.

Peripheral grooves 46A, 46B and 46C comprise a portion of removed or lesser material, forming purposefully weakened connection between the top edge of closure 44 and the top edge of hatch 42, the bottom edge of closure 44 and the bottom edge of hatch 42 as well as between the distal diagonal edges of closure 44 and the diagonal edges of hatch 42. The purposefully weakened connection formed by peripheral grooves 46A, 46B and 46C rendering the top edge of closure 44, the bottom edge of closure 44 and the distal diagonal edges of closure 44 tearable or cleavable or otherwise disconnectable from the top, bottom and distal diagonal edges of hatch 42, respectively.

Disposable container 40 further comprises hinge perforation pattern 52, disposed in-between proximal edge of hatch closure 44 and respective edge of hatch 42. Hinge perforation pattern 52 is configured to sustain partial rotation of hatch closure 44, typically outwards disposable container 40, by being slightly bent or deformed, without disconnecting hatch closure 44 from the respective edge of hatch 42 and while substantially maintaining structural integrity of hinge perforation pattern 52.

Hatch closure 44 further comprises annular finger tab 54, facilitating initially disconnecting or cleaving the purposefully weakened connection formed by peripheral grooves 46A, 46B and 46C, by pulling onto finger tab 54, as well as then driving hatch closure 44 into an open conformation (not shown), by slightly bending or deforming hinge perforation pattern 54. Hatch closure 44 preferably further comprises a planar surface 56, configured for inscribing miscellaneous information thereon.

Disposable container 40 preferably further comprises lateral groove 58. Lateral groove 58 is configured to receive finger tab 54, in an open conformation (not shown), and lock the former within the latter. Upon opening hatch closure 44, by pulling onto finger tab 54 and slightly bending or deforming hinge perforation pattern 52 as well as by slightly bending or deforming hatch closure 44, finger tabs 54 is cable of being drawn towards lateral groove 58.

Upon introducing finger tab 54 into lateral groove 58 and releasing hatch closure 44, hatch closure 44 is spontaneously locked within lateral groove 58, due to the elastic bias of perforation pattern 52 as well as the elastic bias of hatch closure 44, thereby rendering hatch 42 in an open conformation (not shown) and facilitating sample removal from disposable container 40. Upon completion of sample removal from disposable container 40, finger tab 54 are typically released from lateral groove 58 by forcefully pulling finger tab 54 away from disposable container 40 and hatch closure 44 is spontaneously driven by the elastic bias of perforation pattern 54 and hatch closure 44, into a re-closed conformation (not shown), essentially resembling to the closed conformation shown in FIG. 3A to 3C.

It is emphasized, however, that contradistinctively to the container disclosed in US2016039598 shown in FIG. 1, upon completion of sample removal from disposable container 40 and return of hatch closure 44 into a re-closed conformation (not shown), essentially resembling to the closed conformation shown in FIG. 3A to 3C, the mechanism of peripheral grooves 46A, 46B and 46C still bears a clear indication vividly apparent upon visual inspection that hatch closure 44 has been tampered and/or opened since the top edge of closure 44, the bottom edge of closure 44 and the distal diagonal edges of closure 44 remain disconnected from the top edge of hatch 42, the bottom edge of hatch 42 and the diagonal edges of hatch 42, respectively, whereas closure 44 typically remain slightly bent or disposed somewhat outwards hatch 42.

Figure 4A:
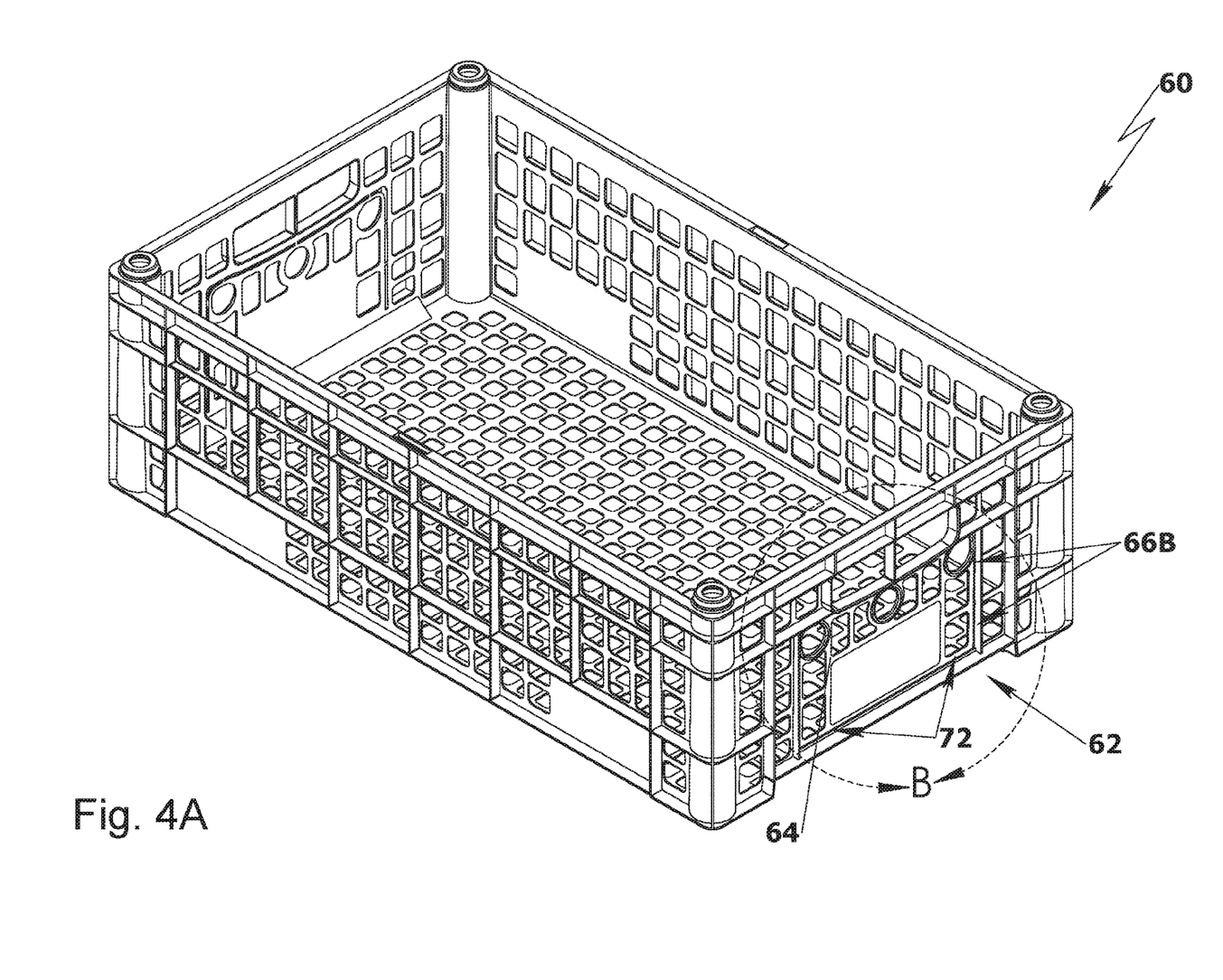
FIG. 4A is a schematic isometric view of yet another embodiment of a disposable container, according to the present invention, configured with a tamper indicative hatch for sample removal.
Figure 4B:
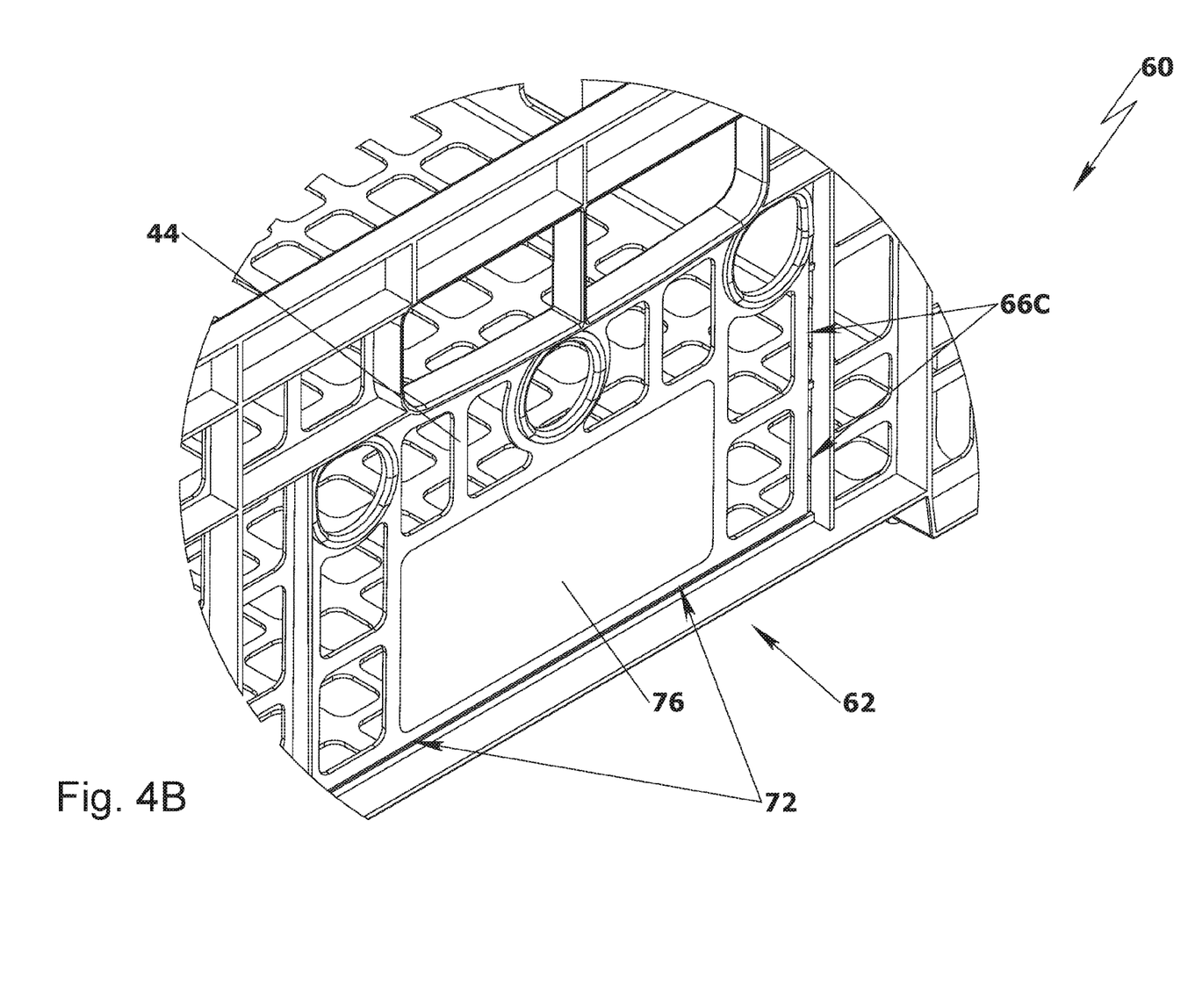
FIG. 4B is an enlarged isometric view of yet another embodiment of a door of the tamper indicative hatch for sample removal, according to the present invention.
Figure 4C:
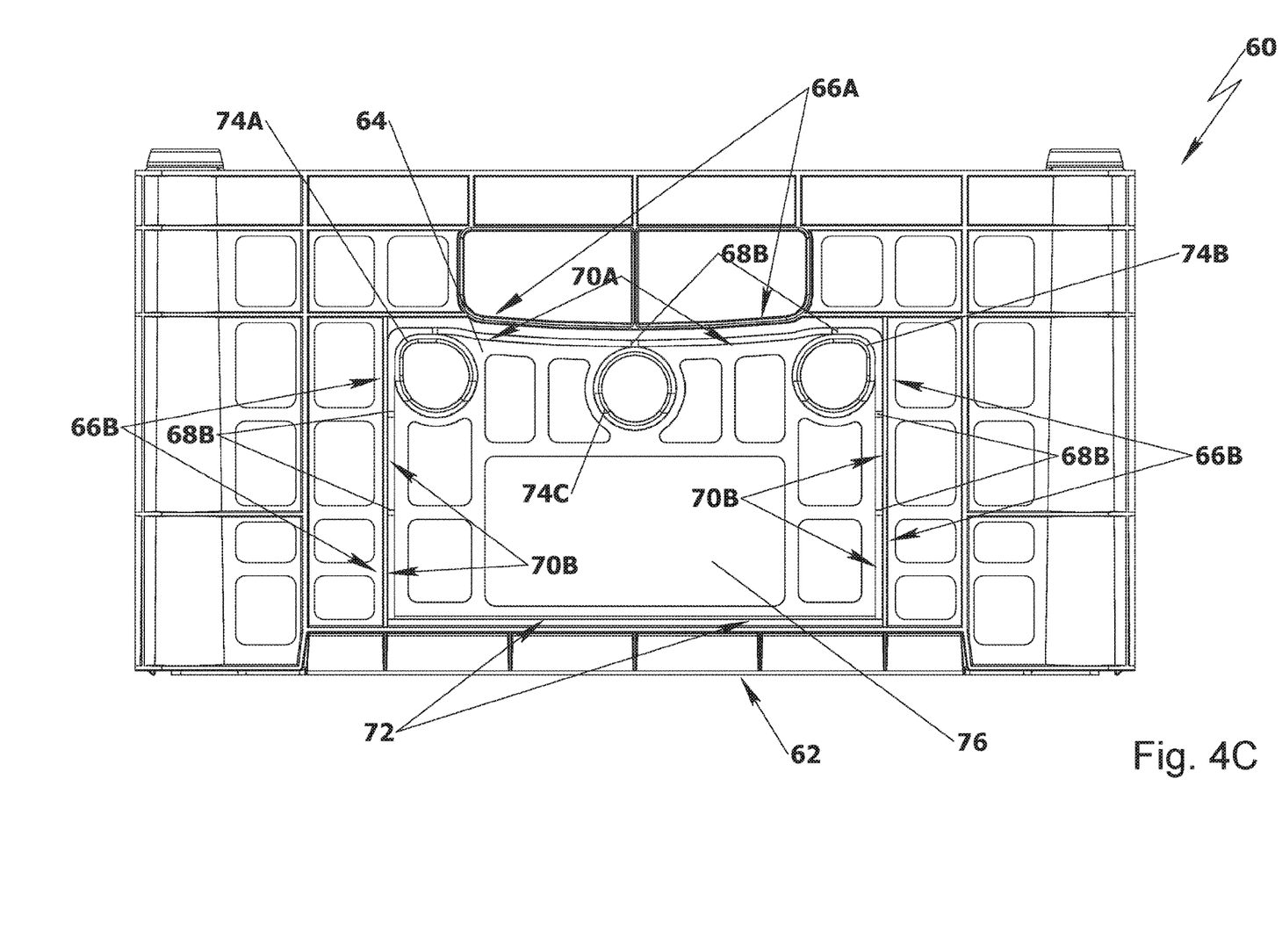
FIG. 4C is a schematic front view of yet another embodiment of the disposable container, according to the present invention, configured with a tamper indicative hatch for sample removal.

In accordance with yet some other preferred embodiments of the present invention, reference is now made to FIG. 4A to 4C, showing disposable container 60. Disposable container 60 comprises hatch 62, facilitating removal of a sample from disposable container 60. Sample removal hatch 62 is obstructed by hatch closure 64. Hatch closure 64 comprises a mechanism providing for indication of whether hatch closure 64 has been tampered and/or opened. Exemplary mechanism providing for indication of whether hatch closure 64 has been tampered and/or opened embodies perforation pattern 66A disposed in-between the top edges of closure 64 and the top edge of hatch 62 and perforation patterns 66B disposed in-between the lateral edges of closure 64 and the lateral edges of hatch 62. Perforation patterns 66A and 66B comprise essentially elongated gaps 68A and 68B interposed by detachable connectors 70A and 70B. Elongated gaps 68A and 68B as well detachable connectors 70A and 70B are preferably equidistant. Detachable connectors 70A interconnect the top edge of closure 64 with the top edge of hatch 62, while detachable connectors 70B interconnect the lateral edges of closure 64 with the lateral edges of hatch 62.

Disposable container 60 further comprises hinge groove 72, disposed in-between bottom edge of hatch closure 64 and bottom edge of hatch 62. Hinge groove 72 comprises a portion of removed or lesser material, forming purposefully weakened connection between bottom edge of hatch closure 64 and bottom edge of hatch 62, configured to sustain partial rotation of hatch closure 64, typically outwards disposable container 60, by being slightly bent or deformed, without disconnecting hatch closure 64 from the respective edge of hatch 62 and while substantially maintaining structural integrity of hinge groove 72.

Hatch closure 64 further comprises annular finger tabs 74A, 74B and 74C, facilitating initially disconnecting detachable connectors 70A and 70B, by pulling onto finger tab 74, as well as then driving hatch closure 64 into an open conformation (not shown), by slightly bending or deforming hinge groove 72. Hatch closure 64 preferably further comprises a planar surface 76, configured for inscribing miscellaneous information thereon.

Upon completion of sample removal from disposable container 60, finger tabs 74A, 74B and 74C are typically released and hatch closure 64 is spontaneously driven by the elastic bias of hinge groove 72 and hatch closure 64, into a re-closed conformation (not shown), essentially resembling to the closed conformation shown in FIG. 4A to 4C. It is emphasized, however, that contradistinctively to the container disclosed in US2016039598 shown in FIG. 1, upon completion of sample removal from disposable container 60 and return of hatch closure 64 into a re-closed conformation (not shown), essentially resembling to the closed conformation shown in FIG. 4A to 4C, the mechanism of perforation patterns 66A and 66B still bears a clear indication vividly apparent upon visual inspection that hatch closure 64 has been tampered and/or opened since detachable connectors 70A and 70B remain disconnected, whereas closure 64 typically remain slightly bent or disposed somewhat outwards hatch 62.

It should be appreciated that the stackable container with a hatch for sample removal, according to the present invention, is of the disposable type; whereas the containers known in the art, such as in US20110240657 and/or WO2014176292 are of the reusable type. Accordingly, the solution of the present invention configured to provide a tamper indicative hatch for sample removal within limitations characteristic to the manufacture of disposable containers.

Moreover, the stackable container with a hatch for sample removal, according to the present invention, does not require auxiliary opening or cutting tools to render the sample removal door open, as opposed to US20110240657.

Furthermore, the stackable container with a hatch for sample removal, according to the present invention, provides an optimal and completely non-destructive means for fruit sampling when containers are stacked, effectively preventing a potential damage to the contents of the container when using auxiliary means, such as scissors or knife, to open hatch, as opposed to US20110240657.

Additionally, the stackable container with a hatch for sample removal, according to the present invention, provides a mechanism for securing of the door of the sample removal hatch in an open conformation, thereby facilitating a more convenient way for removing the sample by hand.

Ultimately, the stackable container with a hatch for sample removal, according to the present invention, is characterized by having a distinct portion forming a purposefully breakable connection between another closure element and/or an edge of said hatch, embodying a perforation pattern with gaps or a peripheral groove with weakened material, configured for being teared and detached, and may further include another distinct hinge portion, configured to sustain partial rotation of the closure element, by being slightly bent or deformed, while substantially maintaining structural integrity of the hinge portion, embodying another perforation pattern with gaps or another peripheral groove with weakened material, configured for being bent.

Since the hinge portion is purposefully weakened, to a distinctively lesser extent than the detachable portion around the hatch, the present invention yet further sustains the closure element to be conveniently bent or deformed, notably still without any auxiliary opening or cutting tools but by a normal manual force of the user.

CITATIONS OF PATENT LITERATURE

U.S. Pat. Nos. 2,054,785, 537,026, 5,542,598, 7,340,995, US20110240657, US2013146602, US2015197374, US2016039598, US2016096667, EP2698322, GB2489326, GB1324670, WO2014176292

It will be appreciated by persons skilled in the art that the present invention is not limited by what has been particularly shown and described herein above. Rather the scope of the invention is defined by the claims which follow:

The invention claimed is:

1. A disposable stackable container with a hatch, configured for removal of sample from said container, said disposable stackable container comprises:
(a) a rectangular bottom plate, configured for said stacking said disposable stackable container;
(b) two pairs of sidewalls erecting from edges of said bottom plate;
(c) at least one hatch disposed in at least one of said sidewalls, said hatch is configured for removal of a sample from said disposable stackable container;
(d) at least one closure element, configured for essentially obstructing said hatch;
(e) a mechanism configured for providing an indication that said at least one closure element has been subjected to at least one operation selected from the group consisting of: tampering and opening;
wherein said mechanism comprises at least one structural element, forming a manually breakable connection between at least one edge of said closure element and at least one respective edge of said hatch, selected from the group consisting of:
a perforation pattern comprising a plurality of essentially elongated gaps and a plurality of detachable connectors disposed in-between said gaps, and
a peripheral groove comprising a portion of weakened material, configured for being teared;
said disposable stackable container is characterized by that upon removal of said sample, said at least one closure element is returnable into an essentially re-closed conformation, while said mechanism still bears a visually apparent indication that said at least one closure element has been subjected to said at least one operation selected from the group consisting of: tampering and opening;
wherein said at least one structural element, forming said breakable connection, is configured to be opened without any external opening or cutting tools;
wherein said at least one structural element, forming said breakable connection, is configured for effectively detaching said at least one closure element, by tearing up said at least one structural element forming said breakable connection, thereby providing for fruit sampling when containers are stacked;
wherein in an open conformation, said at least one sidewall remains in place and remains essentially in its entirety, except of a partial opening of said hatch formed in a center of said at least one sidewall;
wherein in said open conformation, said partial opening of said hatch formed in said center of said at least one sidewall maintains integrity of an exterior perimeter of said at least one sidewall;
wherein said container comprises:

(f) at least one pulling tab, configured for exerting a manual force onto said at least one closure element, wherein said at least one pulling tab comprises an aperture into which a finger is introducible and wherein said at least one pulling tab forms an integral part of said at least one closure element;
(g) a hinge portion configured to sustain partial rotation of said closure element, relatively to said sidewall, by being bent or deformed, wherein said hinge portion comprising at least one structural element selected from the group consisting of:
a perforation pattern comprising a plurality of gaps interposed by a plurality of detachable connectors, and
a peripheral groove comprising a portion of weakened material, configured for being bent;
wherein said at least one structural element, forming said breakable connection between said at least one edge of said closure element and at least one respective edge of said hatch, is weakened to a distinctively different extent than said hinge portion forming a bendable or deformable connection between said closure element and said sidewall sustaining partial rotation of said closure element relatively to said sidewall.

2. The disposable stackable container, as in claim 1, wherein said at least one closure element comprises a first closure element and a second closure element, wherein said mechanism comprises at least one structural element, forming a breakable connection between at least one edge of said first closure element and at least one respective edge of said second closure element, selected from the group consisting of:
a perforation pattern comprising a plurality of essentially elongated gaps and a plurality of detachable connectors disposed in-between said gaps, and
a peripheral groove comprising a portion of weakened material, configured for been teared.

3. The disposable stackable container, as in claim 1, wherein said at least one closure element further comprises a planar surface, configured for inscribing miscellaneous information thereon.

4. The disposable stackable container, as in claim 1, wherein said at least one closure element is spontaneously driven by the elastic bias of said hinge portion, into said re-closed conformation.

5. A method of manufacturing a disposable container with a tamper indicative hatch, configured for sample removal, said method comprises:
(a) molding a bottom plate and two pairs of sidewalls of said disposable container;
(b) shaping a mold to form at least one hatch in at least one of said sidewalls, said hatch is configured for removal of a sample from said disposable container;
(c) molding at least one closure element, configured for essentially obstructing said hatch;
(d) shaping said mold to form a breakable structural element connecting between at least one edge of said closure element and at least one respective edge of said hatch, selected from the group consisting of:
a perforation pattern comprising a plurality of essentially elongated gaps and a plurality of detachable connectors disposed in-between said gaps, and
a peripheral groove comprising a portion of weakened material, configured for been teared;
(e) shaping said mold to form at least one pulling tab, configured for exerting a manual force onto said at least one closure element, wherein said at least one pulling tab comprises an aperture into which a finger is introducible and wherein said at least one pulling tab forms an integral part of said at least one closure element;

(f) shaping said mold to form a hinge portion configured to sustain partial rotation of said closure element relative to said sidewall, by been bent or deformed, wherein said hinge portion comprising at least one structural element connecting said closure element to said disposable container, selected from the group consisting of:
 a perforation pattern comprising a plurality of gaps interposed by a plurality of bendable connectors, and
 a peripheral groove comprising a portion of weakened material, configured for been bent;
wherein said at least one structural element, forming a breakable connection between said at least one edge of said closure element and at least one respective edge of said hatch, is weakened to a distinctively different extent than said hinge portion configured to sustain partial rotation of said closure element relatively to said sidewall;
said disposable container is characterized by that upon removal of said sample, said at least one closure element is returnable into an essentially re-closed conformation, while still bearing a visually apparent indication that said at least one closure element has been subjected to at least one operation selected from the group consisting of: tampering and opening;
said disposable stackable container is further characterized by that said at least one structural element, forming said breakable connection, is configured to be opened without any external opening or cutting tools;
said disposable stackable container is further characterized by that said at least one structural element, forming said breakable connection, is configured for effectively detaching said at least one closure element, by tearing up said at least one structural element forming said breakable connection, thereby providing for fruit sampling when containers are stacked;
wherein in an open conformation, said at least one sidewall remains in place and remains essentially in its entirety, except of a partial opening of said hatch formed in a center of said at least one sidewall;
wherein in said open conformation, said partial opening of said hatch formed in said center of said at least one sidewall maintains integrity of an exterior perimeter of said at least one sidewall.

6. The method of manufacturing a disposable container, as in claim 5, further comprises shaping said mold to form a first closure element, a second closure element and a breakable connection between at least one edge of said first closure element and at least one respective edge of said second closure element, selected from the group consisting of:
 a perforation pattern comprising a plurality of essentially elongated gaps and a plurality of detachable connectors disposed in-between said gaps, and
 a peripheral groove comprising a portion of weakened material, configured for being teared.

7. The method of manufacturing a disposable container, as in claim 5, further comprises shaping said mold to form a planar surface, configured for inscribing miscellaneous information thereon.

8. The method of manufacturing a disposable container, as in claim 5, wherein said shaping of said mold comprises forming said hinge portion, so that said at least one closure element is spontaneously driven by the elastic bias of said hinge portion, into said re-closed conformation.

9. A method of using a disposable container with a tamper indicative hatch, said method comprises:
(a) providing a disposable container comprising:
 a bottom plate and two pairs of sidewalls;
 at least one hatch in at least one of said sidewalls;
 at least one closure element, configured for essentially obstructing said hatch;
 a breakable structural element connecting at least one edge of said closure element to at least one respective edge of said hatch, selected from the group consisting of:
  a perforation pattern comprising a plurality of essentially elongated gaps and a plurality of detachable connectors disposed in-between said gaps, and
  a peripheral groove comprising a portion of weakened material, configured for been teared;
 said at least one structural element, forming said breakable connection, is further characterized by that said at least one structural element is configured to be opened without any external opening or cutting tools;
 said at least one structural element, forming said breakable connection, is further characterized by that said at least one structural element is configured for effectively detaching said at least one closure element, by tearing up said at least one structural element forming said breakable connection, thereby providing for fruit sampling when containers are stacked;
 wherein in open configuration, said at least one sidewall remains in place and remains essentially in its entirety, except of a partial opening of said hatch formed in a center of said at least one sidewall;
 wherein in an open configuration, said partial opening of said hatch formed in said center of said at least one sidewall maintains integrity of an exterior perimeter of said at least one sidewall;
 wherein said disposable container further comprises at least one pulling tab, configured for exerting a manual force onto said at least one closure element, wherein said at least one pulling tab comprises an aperture into which a finger is introducible and wherein said at least one pulling tab forms an integral part of said at least one closure element;
 wherein said disposable container further comprises a hinge portion configured to sustain partial rotation of said closure element, by being bent or deformed, without disconnecting said closure element from said disposable container and while substantially maintaining structural integrity of said hinge portion, comprising at least one structural element connecting said closure element to said disposable container, selected from the group consisting of:
  a perforation pattern comprising a plurality of gaps interposed by a plurality of detachable connectors and
  a peripheral groove comprising a portion of weakened material, configured for being bent;
 wherein said at least one structural element, forming a breakable connection between said at least one edge of said closure element and at least one respective edge of said hatch, is weakened to a distinctively different extent than said hinge portion configured to sustain partial rotation of said closure element relatively to said sidewall;

(b) exerting a manual force onto said at least one closure element, so as to break said breakable structural element;
(c) opening said at least one closure element;
(d) removing a sample from said container via said hatch;
(e) returning said at least one closure element into an essentially re-closed conformation;
(f) visually inspecting said container;
(g) detecting an apparent indication that said at least one closure element has been opened.

10. The method of using a disposable container, as in claim 9, further comprises inserting a portion of said at least one closure element into at least one groove, so as to affix said at least one closure element, in an open conformation.

* * * * *